Dec. 1, 1959 R. FONT 2,915,612

TEMPERATURE-CONTROLLED ENCLOSURE FOR DUAL ELECTRICAL COMPONENTS

Filed July 10, 1956

INVENTOR.
RAMON FONT
BY Herman L. Gordon
ATTORNEY

United States Patent Office 2,915,612

Patented Dec. 1, 1959

2,915,612

TEMPERATURE-CONTROLLED ENCLOSURE FOR DUAL ELECTRICAL COMPONENTS

Ramon Font, Richmond Hill, N.Y., assignor to Premier Research Laboratories, Inc., New York, N.Y., a corporation of New York Application July 10, 1956, Serial No. 597,001

5 Claims. (Cl. 219—19)

This invention relates to temperature-controlled enclosures for electrical components, and more particularly to a temperature-controlled holder for dual crystal units.

A main object of the invention is to provide a novel and improved temperature-controlled holder for electrical components, such as for dual crystal units, said holder being inexpensive to manufacture, being arranged to accurately maintain the enclosed components at a desired temperature, and being compact in size.

A further object of the invention is to provide an improved temperature-controlled enclosure for a pair of electrical components, said enclosure employing an electrical heating element and a thermostat and being arranged so that the heating element and thermostat are mounted in a plug-in unit which may be readily removed for replacement, repair or readjustment without requiring any wiring changes in the device.

A still further object of the invention is to provide an improved temperature-controlled enclosure for a pair of crystal units, said enclosure being arranged so that the temperature-responsive element thereof is located at a point most suited to simultaneously detect deviations of both of the crystal units from a specified temperature, whereby the heater element associated with the enclosure may be energized when the temperature at said point drops below the specified value, and whereby said specified temperature value may be quickly restored.

A still further object of the invention is to provide an improved dual-crystal temperature-controlled holder wherein the heating element and thermostat are combined in a unitary plug-in member and wherein the thermostat is located so as to be positioned between the crystal units when the unitary member is plugged in, so as to respond to the temperature of the region immediately adjacent the crystal units, said unitary member being provided with thermal conductive means adapted to thermally connect the housings of the crystal units to maintain both units at precisely the same temperature.

A still further object of the invention is to provide an improved temperature-controlled dual crystal holder wherein resilient clamping means are provided to retain the crystal units in their sockets and to exert inward force on said units urging said units against a common heat transfer member which thermally connects the crystal units and maintains said units at precisely the same temperature, as well as preventing displacement of the units as a result of shock or vibration.

A still further object of the invention is to provide an improved temperature-controlled dual crystal holder which is relatively simple to manufacture, which is rugged in construction, which is easy to assemble, and which is provided with means to easily adjust the temperature-sensitive element thereof.

Further objects and advantages of the invention will become apparent from the following description and claims, and from the accompanying drawings, wherein:

Figure 1:
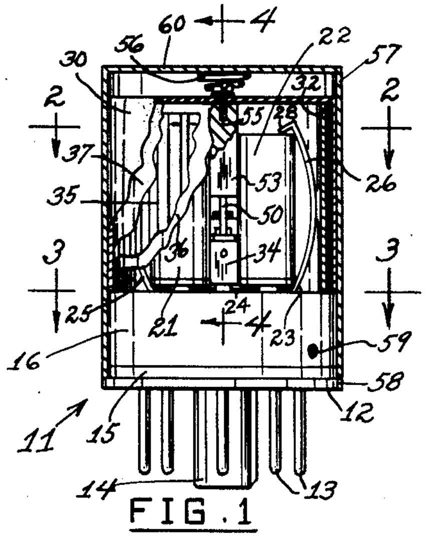
Figure 1 is a vertical cross-sectional view of a temperature-controlled dual crystal holder according to the present invention, with some interior parts shown broken away to reveal structural details.

In temperature-controlled dual crystal ovens of the prior art considerable difficulty has been experienced in accurately maintaining a specified operating temperature for the crystals because of the fact that the temperature-sensing element employed has been heretofore relatively remotely located with respect to the crystals. This is particularly true in the case of holders for crystal units of the hermetically sealed type wherein the crystals are mounted in small, hermetically sealed metal housings having external contact prongs for establishing electrical connections with external circuits. The metal housings for the crystals have relatively small mass, and thus, if not carefully supervised, may readily deviate in temperature from each other by several degrees without such deviation being detected by the temperature-sensing element. It is therefore a prime purpose of the present invention to provide an assembly wherein the dual crystal unit housings are thermally united, so as to be always at the same temperature and wherein the temperature-sensing element is located in a thermal enclosure comprising the crystal unit housings and their thermal connection means, so that the sensing element is always subject to the temperature of the crystal unit housings, and wherein, at the same time, the temperature sensing element and the heater winding associated with the assembly are mounted so as to be readily removable and replaceable as a subassembly of the holder and which may be easily removed for repair, replacement or adjustment without disturbing the wiring of the holder.

Referring to the drawings, 11 generally designates a temperature-controlled dual crystal holder according to the present invention. The crystal holder 11 comprises a circular base 12 having depending contact prongs 13 arranged circularly around an axial depending positioning key 14, whereby holder 11 may be mounted in a conventional tube socket and whereby the components of the holder may be electrically connected to their external circuits.

Figures 3, 6:
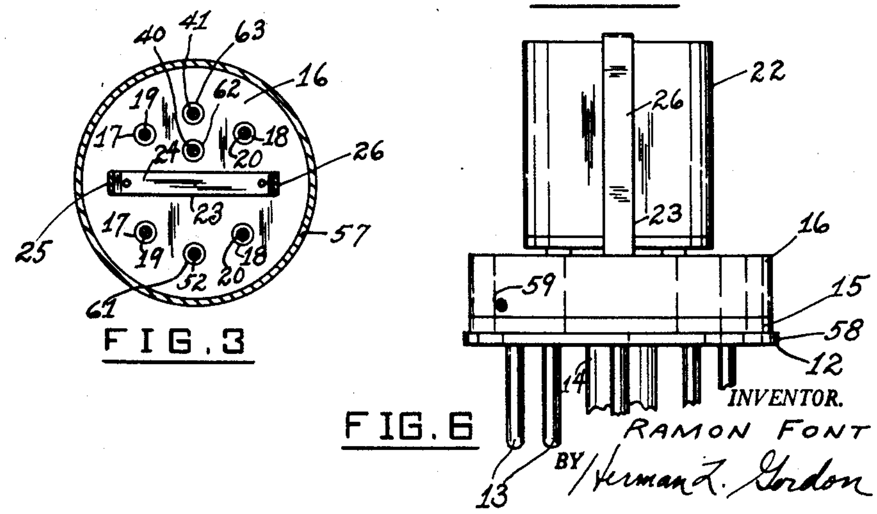
Figure 3 is a horizontal cross-sectional view taken on line 3—3 of Figure 1.
Figure 6 is an enlarged fragmentary elevational view of the base member employed in the holder of Figure 1, showing a hermetically sealed crystal unit mounted thereon.

Base 12 comprises a metallic bottom member 15 on which is secured a circular body member 16 of insulating material. Mounted in body member 16 are two pairs of contact sleeves 17, 17 and 18, 18, as shown in Figure 3, adapted to receive the depending contact prongs 19, 19 and 20, 20 of a pair of conventional hermetically sealed crystal units 21 and 22 of the type having metal housings containing respective piezo-electric crystal assemblies. The pairs of contact sleeves 17, 17 and 18, 18 are arranged symmetrically on opposite sides of a vertical diametral plane so that the crystal units 21 and 22 will be positioned parallel to each other on opposite sides of said diametral plane.

Designated at 23 is a generally U-shaped clamping spring comprising the flat bight portion 24 which is secured to body 16 midway between sleeves 17, 17 and sleeves 18, 18, as shown in Figure 3, and which is provided with the inwardly concave resilient, arcuately bowed clamping arms 25 and 26 extending upwardly from the ends of said bight portion. The top ends of arms 25 and 26 are formed with the respective downwardly and inwardly inclined lug elements 27 and 28 engageable around the top outer corners of the crystal units 21 and 22, as viewed in Figures 1 and 2, whereby the upper portions of the arms 25 and 26 exert inward clamping forces on the top outer corners of the crystal units and whereby the lug elements 27 and 28 restrain the crystal units against upward displacement.

Designated generally at 29 is a plug-in heater and thermostat assembly adapted to be mounted on base 12 in interfitting relationship with the crystal units 21 and 22 and to receive said crystal units therein. The assembly 29 comprises an outer shell member 30 of substantially the same diameter as body 16 and having a flat circular top wall 31. Secured inside shell member 30 is a cylindrical shell member 32, said inner shell member 32 being fastened to outer shell member 30 in any suitable manner, as by a pair of diametrically opposed, radial, inwardly directed pin members 33, shown in Figure 4, extending through said shell members. The inner ends of the pin members engage in the opposite ends of a diametrically positioned block member 34 of insulating material arranged vertically in shell member 32 and being of a thickness to fit closely between the crystal units 21 and 22 when the holder is assembled, as will be presently described.

Surrounding the inner shell member 32 and interposed between said shell member and the outer shell member 30 is a heater winding 35, said winding being insulated from inner shell member 32 by a thin layer 36 of mica or other suitable heat-resisting insulating material, and being insulated from outer shell member 30 by a similar insulating layer 37, of mica, or the like, as shown in Figure 1.

Figure 4:
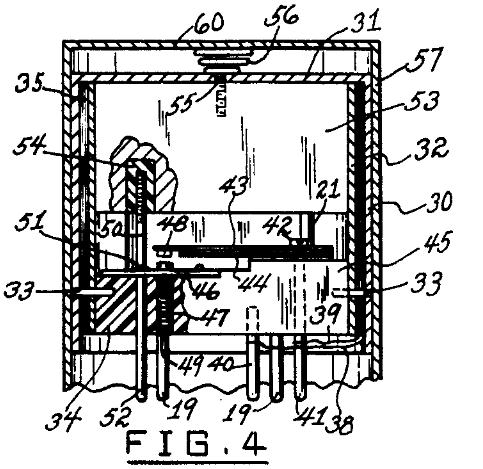
Figure 4 is an enlarged vertical cross-sectional view taken on line 4—4 of Figure 1, with interior portions shown in cross-section.

The terminal wires of heater winding 35, shown at 38 and 39, are connected respectively to a pair of contact prongs 40 and 41 secured in block 34 and depending therefrom, as shown in Figure 4. The contact prong 41 comprises the lower portion of a fastening screw 42 which is engaged vertically through an elevated end portion 45 of block 34 and which rigidly secures a flexible contact arm 43 and an underlying bimetal strip 44 to the top of said elevated end portion 45.

Secured on the opposite end portion of block 34 is a conductive strip 46 through which is threadedly engaged an adjustable vertical contact screw 47 extending through a vertical bore formed in block 34, whose top end is located subjacent a contact element 48 carried by the flexible contact arm 43. The lower end of screw 47 is formed with a screw driver groove 49, accessible from beneath block 34, as shown in Figure 4, whereby said screw may be adjusted vertically with respect to contact element 48.

A vertical contact pin member 50 extends through block 34 and is rigidly secured to strip 46, as by soldering same at 51. The lower end of pin member 50 comprises a vertical depending prong 52, similar to and aligned with the prong elements 40 and 41.

Designated at 53 is a metal block of substantial height and of substantially the same thickness as block 34. Secured in block 53 is a sleeve member 54 of insulating material which threadedly receives the top end of pin member 50. Block 53 is arranged diametrically in the top portion of inner shell member 32 in vertical alignment with block 34 and in close contact with shell 32 at its opposite ends. The spacing between block 53 and the thermostat-supporting block 34 is maintained constant by the pin member 50.

Block 53 is rigidly secured to top wall 31 of outer shell 30 by a fastening screw 55 engaged through a central opening in top wall 31 and threadedly engaged in block 53. Designated at 56 is a conical upwardly flaring coiled spring whose lowermost turn is received beneath the head of screw 55, whereby the spring 56 is anchored centrally to top wall 31.

An outer cylindrical housing 57 is engaged over assembly 29 and over base 12, said base having a peripheral stop rib 58 against which the bottom rim of housing 57 abuts. Housing 57 is detachably secured to base 12 by suitable fastening screws, not shown, extending through apertures provided in the housing and threadedly engaged in tapped holes 59 provided in body 16, as shown in Figure 1.

The coiled spring 56 bears against the top wall 60 of housing 57 and exerts a downward biasing force on assembly 29, urging said assembly 29 toward base 12 and acting to retain the contact prongs 52, 40 and 41 in respective sleeves 61, 62 and 63 provided therefor in body 16.

The sleeves 61 and 62 are suitably wired in base 12 to a pair of external prongs 13, so that the heater winding 35 may be energized from an external source of current, through the thermostat contact elements 47 and 48.

Figure 2:
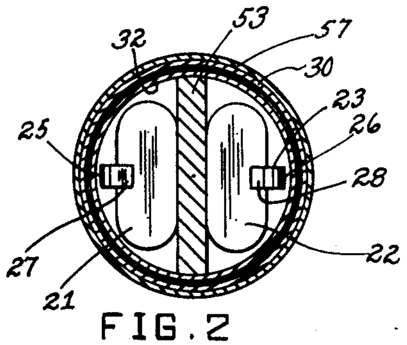
Figure 2 is a horizontal cross-sectional view taken on line 2—2 of Figure 1.
Figure 5:
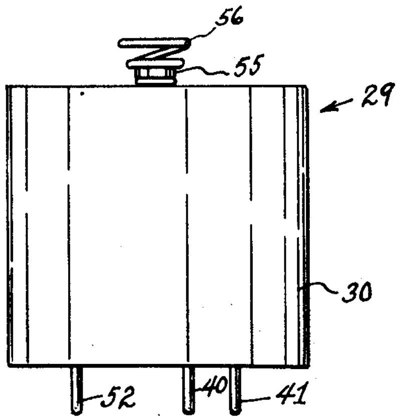
Figure 5 is an enlarged elevational view of the plug-in heater and thermostat assembly employed in the dual-crystal holder of Figure 1.

As shown in Figures 1 and 2, the metal block 53 is closely received between the crystal units 21 and 22 and thermally connects the upper portions of the metal housings of the crystal units. Said metal housings and block 53 thus define an enclosure around the thermostat portion of the assembly, whereby said thermostat portion is always subject to the same temperature as the thermally united crystal units 21 and 22. Since the metal housings of the crystal units are thermally united by the metal block 53, there can be no difference in temperature between the crystal units, and since the thermostat is between and closely adjacent to the intermediate portions of the crystal units, the thermostat will respond essentially to the actual temperature of said crystal units.

The resilient clamping arms 25 and 26 maintain the metal housings of the crystal units in clamping engagement with the metal block 53, insuring close thermal contact of said housings with the block.

When it is necessary to repair, replace or readjust the heater and thermostat assembly 29, the outer housing 57 is removed and the assembly 29 is detached from base 12 by merely withdrawing the prongs 52, 40 and 41 from the sleeves 61, 62 and 63, the blocks 53 and 34 slipping upwardly between the crystal units 21 and 22.

The crystal units 21 and 22 may be readily removed, if so desired, by flexing the arms 25 and 26 outwardly and disengaging the crystal unit prongs 19 and 20 from their contact sleeves 17 and 18.

The holder may be reassembled by reversing the above procedure.

While the above holder has been described in connection with a pair of dual crystal units, obviously the holder may be employed as a temperature-controlled enclosure for various other types of electrical components, such as capacitors, inductances, resistors, or the like.

While a specific embodiment of a temperature-controlled enclosure for electrical components has been disclosed in the above description, it will be understood that various modifications within the spirit of the invention may occur to those skilled in the art. Therefore, it is intended that no limitations be placed on the invention except as defined by the scope of the appended claims.

What is claimed is:

1. In a temperature-controlled holder, a base, a pair of metal housings adapted to receive electrical components, said housings being mounted on said base in spaced side-by-side relation, a hollow support engaged over the housings, a heater winding on said support, a thermostat mounted transversely in said support and being disposed between the housings, contact means on the base, means on the support connected in circuit with the thermostat and heater winding and being detachably engaged with said contact means, a metal block mounted in said support above and in vertical alignment with said thermostat, said block being engaged between and being in contact with the upper portions of the housings and defining a heat-conducting enclosure therewith receiving said thermostat, and a pair of upstanding spring arms mounted on said base and engaging the opposite outer side portions of said housings, said spring arms being formed and arranged to urge said housings clampingly against said block.

2. In a temperature-controlled holder, a base, a pair of metal housings adapted to receive electrical components, said housings being mounted on said base in spaced side-by-side relation, a hollow support engaged over the housings, a heater winding on said support, a thermostat mounted transversely in said support and being disposed between the housings, contact means on the base, means on the support connected in circuit with the thermostat and heater winding and being detachably engaged with said contact means, a thermally conductive block mounted in said support over said thermostat and engaged between the housings, spring means on the support engaging the opposite outer sides of said housings and clamping said housings against said block, the housings and said block defining a heat-conducting enclosure receiving the thermostat, an outer housing engaged over said support and said base, means fastening said outer housing to said base, and spring means secured centrally to the top portion of said support and being interposed between said support and said outer housing.

3. In a temperature-controlled holder, a base, a pair of metal housings adapted to receive electrical components, said housings being mounted on said base in spaced side-by-side relation, a hollow support engaged over the housings, a heater winding on said support, a thermostat mounted transversely in said support and being disposed between the housings, contact means on the base, means on the support connected in circuit with the thermostat and heater winding and being detachably engaged with said contact means, a metal block mounted in said support above and in vertical alignment with said thermostat, said block being engaged between and being in contact with the upper portions of the housings and defining a heat-conducting enclosure therewith receiving the thermostat, a pair of spring arms mounted on said base and engaging the opposite outer side portions of said housings, said spring arms being formed and arranged to urge said housings inwardly and clampingly against said block, an outer housing engaged over said support and said base, means fastening said outer housing to said base, and spring means secured centrally to the top portion of said support and being interposed between said support and said outer housing.

4. In a temperature-controlled holder, a base, a pair of pronged heat-conducting housings adapted to receive electrical components, contact means on the base formed and arranged to receive the prongs of said housings and to support said housings in vertical, side-by-side spaced positions, a plug-in heater and thermostat assembly comprising an outer housing, an inner shell, a heater winding disposed between said outer housing and inner shell, a thermostat mounted in the lower portion of said inner shell, said inner shell being formed and arranged to fit over and receive the first-named pair of housings, the thermostat being located to be received between the first-named pair of housings, terminal means on said plug-in assembly connected in circuit with said thermostat and heater winding, contact means on the base formed and arranged to detachably interengage with said terminal means, with said inner shell receiving said first-named pair of housings and with the thermostat received between the first-named pair of housings, a thermally conductive block member mounted in said inner shell above and in vertical alignment with said thermostat, said block member being formed and arranged to engage between and thermally connect said first-named pair of housings when said terminal means engages with said last-named contact means and to define with said first-named pair of housings a heat-conducting enclosure receiving the thermostat, and spring means on the base engageable with the opposite outer side portions of the first-named pair of housings and being formed and arranged to urge said first-named pair of housings inwardly into clamping engagement with said block member.

5. In a temperature-controlled holder, a base, a pair of metal housings adapted to receive electrical components, said housings being mounted on said base in spaced side-by-side relation, a hollow support engaged over the housings, a heater winding on said support, a thermostat mounted transversely in said support and being disposed between the housings, contact means on the base, terminal means on the support connected in circuit with the thermostat and heater winding and being detachably engaged with said contact means, a metal block mounted in said support above and in vertical alignment with said thermostat, said block being engaged between and being in contact with said housings and defining therewith a heat-conducting enclosure receiving the thermostat, and spring means engaging the opposite outer side portions of the housings and urging said housings clampingly against said block.

References Cited in the file of this patent

UNITED STATES PATENTS

| | | |
|---|---|---|
| 1,950,246 | Hyland | Mar. 6, 1934 |
| 2,384,757 | Kuenstler | Sept. 11, 1945 |
| 2,410,041 | Bokovoy | Oct. 29, 1946 |
| 2,438,345 | Miller | Mar. 23, 1948 |
| 2,470,134 | Bitner | May 17, 1949 |
| 2,498,585 | Seiden | Feb. 21, 1950 |
| 2,651,731 | Overbey et al. | Sept. 8, 1953 |
| 2,814,741 | Minnich et al. | Nov. 26, 1957 |